United States Patent
Vuong et al.

[11] Patent Number: 5,869,776
[45] Date of Patent: Feb. 9, 1999

[54] METHOD AND APPARATUS FOR RECEIVING AND DISPLAYING DIGITAL DATA

[75] Inventors: Son Con Vuong, Kentwood; Karl Allen Beck, Fruitport; Kimberly Scott, Grand Rapids; David Swenson, Spring Lake, all of Mich.

[73] Assignee: Kuhlman Corporation, Spring Lake, Mich.

[21] Appl. No.: 806,967

[22] Filed: Feb. 26, 1997

[51] Int. Cl.$^6$ .............................. G01D 7/02; H02P 8/00
[52] U.S. Cl. ................................. 73/866.3; 318/696
[58] Field of Search ................ 73/806.1, 866.5; 324/115, 144, 146, 160, 163, 164, 166; 318/696; 702/85, 91

[56] References Cited

U.S. PATENT DOCUMENTS

| | | | |
|---|---|---|---|
| 3,126,738 | 3/1964 | Taylor | 73/182 |
| 4,227,150 | 10/1980 | Widl | 324/166 |
| 4,314,146 | 2/1982 | Berney | 318/696 |
| 4,361,790 | 11/1982 | Leasser et al. | 318/696 |
| 4,365,192 | 12/1982 | Rankin et al. | 324/72 |
| 4,809,547 | 3/1989 | Warrow | 73/183 |
| 4,811,255 | 3/1989 | Kelly, III | 324/164 |
| 4,858,135 | 8/1989 | Clish et al. | 701/93 |
| 4,968,930 | 11/1990 | Grupp et al. | 324/115 |
| 5,375,073 | 12/1994 | McBean | 324/115 |
| 5,432,497 | 7/1995 | Briski et al. | 340/525 |
| 5,531,181 | 7/1996 | Cookingham | 116/288 |
| 5,546,888 | 8/1996 | Skiver et al. | 116/286 |
| 5,631,430 | 5/1997 | King et al. | 73/866.1 |
| 5,635,622 | 6/1997 | King | 73/866.1 |
| 5,656,784 | 8/1997 | Butch | 73/861.03 |
| 5,696,704 | 12/1997 | Semrau | 324/166 |
| 5,698,974 | 12/1997 | Van Dyke et al. | 73/866.3 |

FOREIGN PATENT DOCUMENTS

| | | | |
|---|---|---|---|
| 3-175318 | 7/1991 | Japan | 73/866.3 |

OTHER PUBLICATIONS

Serial Data Communications Between Microcomputer Systems in Heavy Duty Vehicle Applications—SAE J1708 Oct. 1990.
"Truck Gages Get on the Bus", Design News Oct. 7, 1996. pp. 116–120.
Ametek/Dixson Instrumentation Catalog pp. 14–15.
Joint SAE/TMC Electronic Data Interchange Between Microcomputer Systems in Heavy–Duty Vehicle Applications—SAE J1587 Nov. 1990.

*Primary Examiner*—George Dombroske
*Assistant Examiner*—Paul D. Amrozowicz
*Attorney, Agent, or Firm*—Dykema Gossett PLLC

[57] ABSTRACT

A method and an apparatus are provided for displaying a value of a measured parameter for an engine-driven vehicle, such as the speed of an engine. The apparatus includes a microcontroller which receives a data signal from a data concentrator. The data signal contains information relating to the value of a parameter which has been measured by a sensor or other measuring device. Based on the value of the data signal the microcontroller generates one or more motor control signals. The motor control signals are used to drive a stepper-motor. The motor rotates an output shaft which has a pointer mounted near one end of the shaft. The angular position of the output shaft upon rotation corresponds to the value of the parameter and the pointer helps to provide a human-readable format for the parameter value.

22 Claims, 9 Drawing Sheets

METHOD AND APPARATUS FOR RECEIVING AND DISPLAYING DIGITAL DATA

FIELD OF THE INVENTION

The present invention relates to a method and apparatus for receiving and displaying data, and more particularly, to receiving and displaying received digital data by means of a motor-driven pointer moving across a dial face of an instrument mounted in an engine-driven vehicle.

BACKGROUND OF THE INVENTION

Since the advent of motorized vehicles it has been desirable to measure and display various characteristics of vehicle performance and operation. While there are many different types of engine-driven vehicles, including automobiles, trucks, aircraft, and boats, the nature of the parameters to be measured and displayed is fundamentally similar, and many are common to all of the aforementioned applications, such as, for example, vehicle speed, engine speed, engine oil pressure, coolant temperature, battery voltage, and remaining fuel.

The mechanism for measuring and displaying these and other parameters generally comprises a sender and a gauge attached thereto. The sender measures the specific parameter of interest and converts that quantity into an electrical signal. The gauge receives the electrical signal from the sender and converts it into a human-readable display, such as, for example, a movement of a pointer across a dial face. Typically, the gauge includes a housing and a display mechanism. The housing, which has a viewing window, protects the display mechanism from dirt and moisture, while the display mechanism receives the electrical signal generated by the sender, converts the signal into a human-readable format, and displays it, such as, for example, by moving a pointer across a printed dial face which can be viewed through the housing's window.

Historically, these systems have enjoyed very widespread use and acceptance. Most engine-driven vehicles have at least one such sender and gauge pair, and many, such as dual engine boats, have upwards of seven. However, despite their popularity, traditional sender and gauge systems present certain inherent drawbacks with respect to responsiveness and precision. Traditional gauges employ a display mechanism known as an air core movement in order to move the pointer across the dial face. In general, an air core movement operates by running current through one or more coils of wire, which sets up an electromagnetic field. Variations in sender resistance or voltage change the magnitude and/or direction of the coil current and thus the resulting magnetic field, such that a magnet mounted on a shaft within this field will turn the shaft as it orients itself within the field. A pointer mounted on the shaft is consequently made to turn with the magnet in a one-to-one correspondence, moving the pointer across a dial face.

Lack of precision in display mechanisms with air core movements arises due to lack of precision in the coil wire and magnet. Accuracy typically ranges from three to five percent error, with some air core movements being off by as much as ten percent. Also, air core movements typically have hysteresis, such that they respond differently to a specific sender value, depending on whether the movement was moving clockwise or counterclockwise prior to receiving the sender value. Air core movements are also typically non-linear with respect to linear sender input, such that dial faces must be drawn with increasing or shrinking ranges, making them hard to read. Non-linear senders, such as those used for sensing temperature, add to the inaccuracy, as the dial graphics must try to account for eccentricities of both the sender and the air core movement.

Furthermore, the limited torque generated by a typical air core movement restricts the variety of pointer masses which may be successfully accommodated by the display mechanism, making the display mechanism susceptible to vibration such that hard jolts to the gauges caused by, for example, a boat traveling through rough seas, can make the pointers vacillate considerably across the dial face. While pointer movement is typically damped by means of liquid silicone, to prevent excessive jitter, such damping makes the response sluggish, and the silicone may leak out during shipping.

An additional drawback of air core movements is that the movement within each gauge must be specifically configured to interpret the signal received from the sender, such that it is incapable of being used with a sender of a different scale. For example, traditional fuel senders include, among others, senders which run linearly from 0 to 90 ohms across an Empty to Full range, as well as senders which run linearly from 240 to 33 ohms across the same range. A traditional fuel gauge has a display mechanism that associates specific ohm readings from the sender, such as, for example, 45 ohms, with specific fuel quantities. Consequently, a display mechanism which is designed to operate with the 0 to 90 ohm sender will give inaccurate readings when used with a 240 to 33 ohm sender. This characteristic applies to all traditional sender and gauge pairs, resulting in inconvenience, expense, and even re-work when gauges and senders are not properly matched.

Those skilled in the art will recognize that some traditional gauges, such as speedometers and tachometers, have attempted to address the configuration issue by utilizing dip switches or potentiometers to permit some flexibility in how the display mechanism within the housing interprets the incoming sender signal. These dip switches and potentiometers permit accommodation for a variety of sender characteristics, such as pulses per engine revolution or tire sizes or axle ratios. However, the presence of these configuration options exacerbates one final problem with traditional gauge and sender pairs which pertains to the lack of sealing of the housing.

Vehicle applications include a variety of environments which may be hostile to gauges generally and to their display mechanisms in particular, such as, for example, marine or construction vehicles. As noted previously, the housing portion of traditional gauges serves as a primitive means of protecting the display mechanism from environmental effects. The presence of dip switches or potentiometers dictates that these housings entertain a breach to make the configuration accessible to the gauge installer. Since housings already entertain a breach for servicing the incandescent bulb which provides backlighting, adjustable display mechanisms increase the opportunity for introducing environmental debris such as moisture, salt, or dirt. Hence the vehicle manufacturer must take particular care to shield the gauges from any debris which could negatively affect the performance of their display mechanisms. Likewise, the vehicle owner/operator must provide substantial maintenance to the gauges to remove accumulated debris which may shorten gauge life.

There is thus a need to provide a display apparatus that eliminates or minimizes one or more of the problems as set forth above.

SUMMARY OF THE INVENTION

The present invention provides a method and an apparatus for displaying a value of a measured parameter in an engine-driven vehicle. In so doing, the present invention offers several advantages. First, the present invention is capable of displaying a parameter value with more precision and accuracy than prior display mechanisms. Second, the present invention is capable of dealing with hysteresis. Third, the present invention makes it possible to uses dial faces with uniform ranges of values. Fourth, the present invention is able to incorporate a variety of pointer masses. Fifth, the present invention is capable of use with measuring devices of varying scales. Finally, the present invention can achieve these advantages without requiring an additional breach of the housing containing the display apparatus.

A display apparatus according to the present invention includes internal calibration and sufficient torque to be self-damping, and can read and interpret digital data from a bus and precisely display that information by means of a pointer movement across a dial face, while being contained in a sealed housing.

A display apparatus in accordance with the present invention includes means, responsive to a first parameter value, for generating a motor control signal and a motor assembly having a stepper-motor portion, the stepper-motor portion responsive to the motor control signal, for rotating an output shaft extending from the motor assembly. An angular position of the output shaft corresponds to the first parameter value. The parameter value to be displayed may be, for example, a speed of a vehicle, an engine speed of a vehicle engine, an amount of fuel remaining in a fuel tank of a vehicle, or even a difference between an engine speed of one engine of a vehicle and an engine speed of another engine of the vehicle. The generating means, which may be a microcontroller in a preferred embodiment, generates one or more motor control signals in response to the parameter value. The motor control signals are used to drive the stepper-motor through the use of a driver circuit, and the stepper-motor rotates the output shaft which extends from the motor assembly. The output shaft has a pointer mounted near one end thereof and the pointer sweeps across a dial face as the output shaft rotates, thus displaying the parameter value in a human-readable format.

A method in accordance with the present invention includes the steps of generating, in response to a parameter value, a motor control signal and driving, in response to the motor control signal, a stepper-motor portion of a motor assembly, said assembly having an output shaft extending therefrom. An angular position of the output shaft corresponds to the parameter value. As with the apparatus described above, the parameter value may be, for example, a speed of a vehicle, an engine speed of an engine of a vehicle, an amount of fuel remaining in a fuel tank of a vehicle, or a difference between an engine speed of one engine of a vehicle and an engine speed of another engine of a vehicle. In a preferred embodiment, a microcontroller generates one or more motor control signals in response to the parameter value. The microcontroller first selects a X value, a Y value, and a slope value from a data structure in a memory using the parameter value. The microcontroller then determines the angular position by multiplying the slope value by a result obtained from subtracting the X value from the parameter value, and then adding the Y value after multiplication. Finally, the microcontroller generates the motor control signal(s) in response to the determination. A driver circuit drives the stepper-motor in response to the motor control signal(s). The stepper-motor rotates an output shaft extending from the motor assembly and a pointer mounted near one end of the shaft sweeps across a dial face to display the parameter value in a human-readable format.

These and other features and advantages of this invention will become apparent to one skilled in the art from the following description and the accompanying drawings illustrating features of this invention by way of example.

DETAILED DESCRIPTION OF THE PREFERRED EMBODIMENTS

Figure 1:
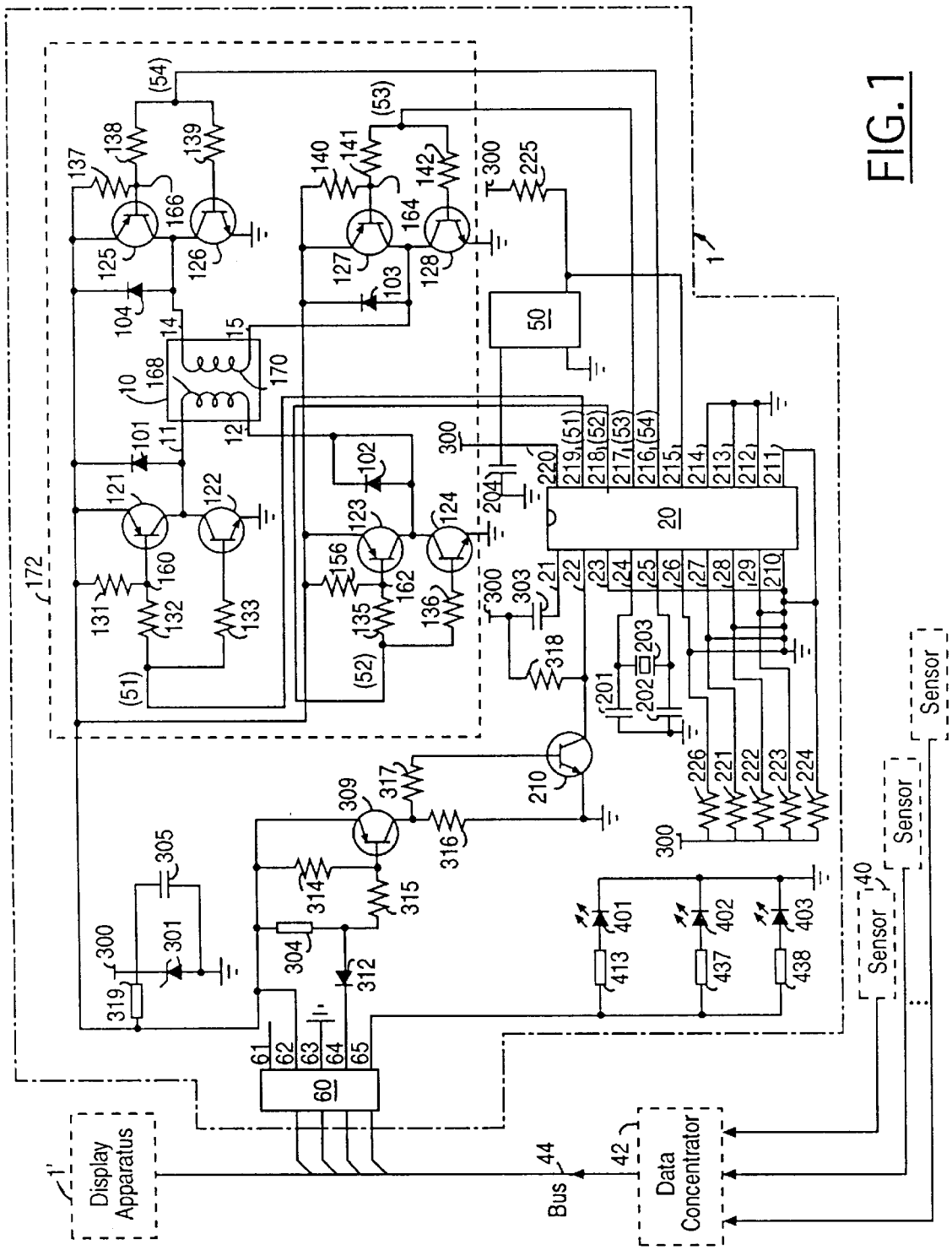
FIG. 1 is a diagram of a circuit for a preferred embodiment of a display apparatus.

Before proceeding to a detailed description of the several aspects of the present invention, the preferred environment for the operation of the present invention will be set forth in detail. FIG. 1 shows a display apparatus 1 for receiving and displaying a value of a measured parameter of an engine-driven vehicle. This parameter may, for example, be the speed of the vehicle, the speed of an engine of the vehicle, the amount of fuel remaining in a fuel tank of the vehicle, or the difference in engine speeds between two engines in the vehicle. The vehicle has one or more sensors 40 which measure the parameter of interest in the vehicle. The sensors then transmit information regarding the measurement to a data concentrator 42. Although embodiments of the present invention are suitably adapted for use in any engine-driven vehicle, a preferred embodiment of the invention finds application in a marine setting, specifically in an engine-driven watercraft. Therefore, if the parameter of interest is the speed of the watercraft as it moves through the water, the sensor may be similar to the venturi pressure pickup described in Applicant's copending application entitled "Venturi Type Speed Measuring Device," Ser. No. 08/728,573, filed Oct. 10, 1996, and the data concentrator may be similar to the data concentrator described in Applicant's copending application entitled "Method and Apparatus for Concentrating Data," Ser. No. 08/795,527, filed Feb. 14, 1997. Both of these copending applications are fully incorporated herein by reference. Data concentrator 42 transmits data along a bus 44 to display apparatus 1 through a sealed connector 60. Data concentrator 42 may also transmit data along bus 44 to another display apparatus, such as display apparatus 1'. Display apparatus 1 receives the data from bus 44 and converts it to a human-readable form by, for example, the movement of a pointer across a dial face.

It should be appreciated that the disclosure of the present invention is in such detail as to enable one of ordinary skill in the art to make and use the invention. Accordingly, the description is exemplary, rather than limiting in nature. Moreover, to clearly describe how to make an embodiment of the present invention, where applicable, part numbers for commercially available parts are set forth.

Referring now to FIG. 1, a preferred embodiment of a circuit for a display apparatus 1 includes sealed connector 60 which preferably has four inputs: a power signal 62 of, for example, seven volts derived from a power source, a ground signal 63 of, for example, zero volts, a single wire data bus 64, and a light signal 65. Single wire data bus 64 carries a first data input signal having a first parameter value. Sealed connector 60 also includes an expansion connector port 61 which may be used to accommodate enhancements or alternative embodiments of display apparatus 1. Power signal 62 is preferably a regulated, noise-filtered voltage which is reduced to five volts by means of first Zener diode 301, which may be, for example, a ZM5230 BCT, through nineteenth resistor 319, which has a value of, for example, 56 ohms, into a precision voltage signal 300, which is preferably 5 volts. Those skilled in the art will recognize that the power dissipated by nineteenth resistor 319 dictates the wattage of said resistor. A second capacitor 305 between precision voltage signal 300 and ground reduces any residual noise in precision voltage signal 300 and may have a value of, for example, 1 microfarad.

Continuing with FIG. 1, single wire data bus 64 is protected by a fifth diode 312, such as, for example, a PMLL4148, which prevents single wire data bus 64 from being dragged down in the event that display apparatus 1 is unable to maintain power. A thirteenth resistor 304, which may have a value of, for example, 470 ohms, pulls single wire data bus 64 up to power signal 62. Those skilled in the art will recognize that thirteenth resistor 304 should be of sufficient wattage to dissipate the power therethrough. A ninth transistor 309, such as, for example, MMBT4403, is employed to detect transitions of single wire data bus 64 while buffering out noise, in conjunction with a fourteenth resistor 314, which may have a value of, for example, 100K ohms, and a fifteenth resistor 315, which may have a value of, for example 47K ohms. Since ninth transistor 309 is preferably a PNP transistor, it is immune to common mode problems which could be caused by differences between the voltage levels of ground signal 63 and the ground of the device generating single wire data signal 64. A tenth transistor 310, which may be, for example, an MMBT4401, is used in conjunction with a seventeenth resistor 317, which may have a value of, for example, 47K ohms; a sixteenth resistor 316, which may have a value of, for example, 4.7K ohms; and an eighteenth resistor 318, which may have a value of, for example, 47K ohms and is pulled up to precision voltage signal 300. The purpose of tenth transistor 310 is to undo the inherent inversion generated by ninth transistor 309 such that a serial data signal 22 is preferably of zero to five volt range, marking in the "high" or five volt position.

Continuing with FIG. 1, light signal 65 is used to light a first light emitting diode 401, a second light emitting diode 402, and a third light emitting diode 403, all of which could be, for example, an LTL-353URK. Current to light emitting diodes 401, 402, 403 is limited by a first LED resistor 413, a second LED resistor 437, and a third LED resistor 438, respectively, each of which could have a value of, for example, 470 ohms, and should be of sufficient wattage to dissipate the generated power. Those skilled in the art will recognize that while a plurality of light emitting diodes 401, 402, 403 and LED resistors 413, 437, 438 are shown, a single light emitting diode of sufficient brightness could also be employed without departing from the spirit or scope of the present invention.

Figure 2:
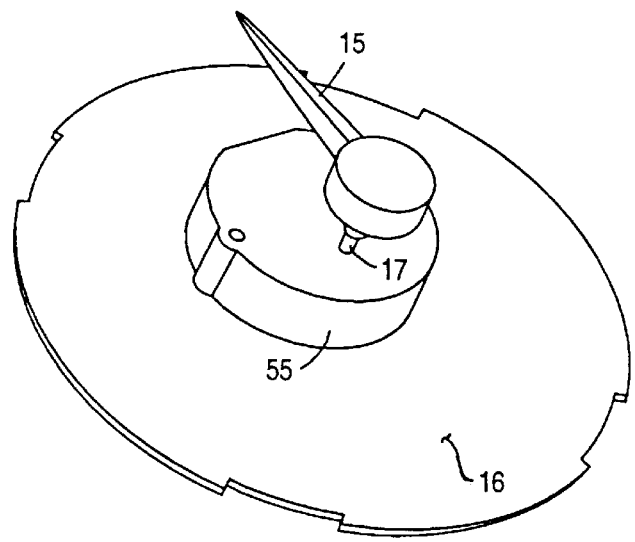
FIG. 2 is a diagram of a display apparatus showing the physical relationship of the parts thereof.

Continuing with FIG. 1, display apparatus 1 includes means, such as microcontroller 20 which may be, for example, a 29C8051 manufactured by Amtel, Inc., for generating, one or more motor control signals in response to a parameter value. Microcontroller 20 receives one or more data input signals, such as the first data input signal carried by single wire data bus 64. Each of the data input signals has a parameter value and the motor control signals are generated in response to that value. The motor control signals are used to drive a stepper-motor portion 10 of a motor assembly. Stepper-motor 10 rotates an output shaft 17 extending from the assembly, as seen in FIG. 2. As discussed more fully hereinbelow, an angular position of the output shaft corresponds to the parameter value. Microcontroller 20 may be controlled through the use of external control signals provided to input terminals of microcontroller 20 or through a set of program steps programmed directly into a memory of microcontroller 20.

Microcontroller 20 receives controller power 220 from precision voltage signal 300 and receives controller ground 210 from ground signal 63. Microcontroller 20 is reset by means of reset signal 21 which is tied to precision voltage signal 300 through a first capacitor 303, which has a value of 1 microfarad as recommended by the manufacturer of microcontroller 20. The fundamental timing frequency of microcontroller 20 is controlled by a crystal 203, which may be, for example, an HC49SD-11.0592, which provides a first crystal signal 24 and a second crystal signal 25 to microcontroller 20. Crystal 203 works in conjunction with a first crystal capacitor 201 and a second crystal capacitor 202 which may each have a value of, for example, 33 picofarads, as dictated by the manufacturer of microcontroller 20. In a preferred embodiment, crystal 203 oscillates at a frequency of 11.0592 Megahertz.

Continuing with FIG. 1, microcontroller 20 may include an auxiliary meter signal 215 for driving an optional self-contained auxiliary meter 50, such as, for example, an hourmeter. Auxiliary meter 50 would preferably be supplied with ground signal 63 and with precision voltage 300, which would pass to ground through a noise-reducing auxiliary meter capacitor 204, which might have a value of, for example, 0.1 microfarads. Auxiliary meter signal 215 would preferably be pulled up to precision voltage signal 300 through an auxiliary meter resistor 225, which might have a value of, for example, 1.5K ohms. While the instant invention provides the ability to support this additional meter function, it is not essential to the underlying invention and may be omitted without departing from the spirit or scope thereof. Rather, the purpose of the instant invention is to operate stepper-motor 10 by means of a first motor control signal 219 (S1), a second motor control signal 218 (S2), a third motor control signal 217 (S3), and a fourth motor control signal 216 (S4), which are output by microcontroller 20 on a first output terminal, a second output terminal, a third output terminal, and a fourth output terminal, respectively, of microcontroller 20. Those skilled in the art will recognize that the quantity of motor control signals to be generated depends on the requirements dictated by motor 10 and that an alternative motor could require greater or fewer motor control signals without departing from the scope and spirit of the instant invention.

Continuing with FIG. 1, microcontroller 20 may optionally include a first configuration indicator 26, a second configuration indicator 27, a third configuration indicator 28, a fourth configuration indicator 29, and a fifth configuration indicator 211, each of which is tied directly to ground signal 63 and indirectly to precision voltage 300 through a first configuration pullup resistor 226, a second configuration pullup resistor 221, a third configuration pullup resistor 222, a fourth configuration pullup resistor 223, and a fifth configuration pullup resistor 224, respectively, each of which may have a value of, for example, 10K ohms. The connection from each configuration indicator 26, 27, 28, 29, 211 to ground may be optionally severed to select a particular configuration for microcontroller 20. Those skilled in the art will recognize that the concept of utilizing configuration indicators has long been practiced by means of dipswitches and other similar devices. Note that five indicators would permit thirty-two possible configurations for microcontroller 20, which might provide for economies of scale if a masked version of microcontroller 20 were selected. However, if microcontroller 20 is easily programmed in the manufacturing process, then the multiple configuration option is not necessarily desirable. While the instant invention provides the ability to support multiple configurations, it is not essential to the underlying invention and may be omitted without departing from the spirit or scope thereof. Also, microcontroller 20 also includes a first unused port 23, a second unused port 212, a third unused port 213, and a fourth unused port 214, all of which are terminated to ground signal 63. Those skilled in the art will recognize that these are not essential to the scope and spirit of the present invention and are merely present to permit enhancement or improvements thereto.

Continuing with FIG. 1, stepper-motor 10 which may be, for example, an M-S 310.448 manufactured by ETA SA Fabriques d'Ebauches, is provided for rotating an output shaft 17 (as seen in FIG. 2) responsive to motor control signals 219 (S1), 218 (S2), 217 (S3) and 216 (S4). Motor 10 includes a first coil 168 having a first coil end 11 and a second coil end 12 extending from motor 10 and a second coil 170 having a third coil end 13 and a fourth coil end 14 extending from motor 10. In general, motor 10 is made to turn by presentation of a pattern of logical one or logical zero voltages on coil ends 11, 12, 13, 14, according to manufacturer's specifications. This can be accomplished through the use of driver circuit 172 which provides a means, responsive to first motor control signal 219 and second motor control signal 218, for generating a current in first coil 168 and a means, responsive to third motor control signal 217 and fourth motor control signal 216, for generating a current in second coil 170.

Driver circuit 172 may be divided into four sections with each section connected to one of coil ends 11, 12, 13, and 14 and responsive to one of motor control signals 219 (S1), 218 (S2), 217 (S3), and 216 (S4). Each section of driver circuit 172 includes a diode, which is represented in FIG. 1 by first diode 101, second diode 102, third diode 103, and fourth diode 104. First diode 101, second diode 102, third diode 103, and fourth diode 104, which may each be, for example, a PMLL4148, are disposed between one of respective coil ends 11, 12, 13, 14 and a power source, here provided by power signal 62, to suppress transients that exceed supply voltage, which may arise due to the internal coils of motor 10. The section of driver circuit 172 responsive to motor control signal 219 (S1), includes a first transistor 121, a second transistor 122, a first resistor 131, a second resistor 132, and a third resistor 133. First transistor 121, which may be, for example, an MMBT4403CT, is driven by first motor control signal 219 through second resistor 132, which may have a value of, for example, 4.7K Ohms. Second resistor 132 has one end connected to the first terminal of microcontroller 20 and another end connected to a node 160. Second resistor 132 is pulled up to power signal 62 through first resistor 131, which may have a value of, for example, 680 Ohms. First resistor 131 has one end connected to a power source, here provided by power signal 62, and another end connected to node 160. The collector of first transistor 121 is tied to first coil end 11 and to the collector of second transistor 122, which may be, for example, an MMBT4401CT, and which is also driven by first motor control signal 219 through third resistor 133, which may have a value of, for example, 10K Ohms. Third resistor 133 is connected at one end to the first terminal of microcontroller 20 and at another end to the base of transistor 122. The emitter of first transistor 121 is connected to a power source, again provided by power signal 62. The emitter of transistor 122 is connected to ground.

The section of driver circuit 172 responsive to motor control signal 218 (S2), includes a third transistor 123, a fourth transistor 124, a twelfth resistor 156, a fourth resistor 135, and a fifth resistor 136. Third transistor 123, which may be, for example, an MMBT4403CT, is driven by second motor control signal 218 through fourth resistor 135, which may have a value of, for example, 4.7K Ohms. Fourth resistor 135 is pulled up to power signal 62 through twelfth resistor 156, which may have a value of, for example, 680 Ohms. Fourth resistor 135 is connected at one end to the second terminal of microcontroller 20 and at another end to node 162. Twelfth resistor 156 is connected at one end to a power supply, here provided by power signal 62, and at another end to node 162. The collector of third transistor 123 is tied to second coil end 12 and to the collector of a fourth transistor 124, which may be, for example, an MMBT4401CT, and which is also driven by second motor control signal 218 through fifth resistor 136, which may have a value of, for example, 10K Ohms. Fifth resistor 136 is connected at one end to the second terminal of microcontroller 20 and at another end to the base of transistor 124. The emitter of transistor 123 is connected to a power supply, again provided by power signal 62. The emitter of transistor 124 is connected to ground.

The section of driver circuit 172 responsive to motor control signal 217 (S3), includes a seventh transistor 127, an eighth transistor 128, a ninth resistor 140, a tenth resistor 141, and an eleventh resistor 142. Seventh transistor 127, which may be, for example, an MMBT4403CT, is driven by third motor control signal 217 through tenth resistor 141, which may have a value of, for example, 4.7K Ohms. Tenth resistor 141 is pulled up to power signal 62 through ninth resistor 140, which may have a value of, for example, 680 Ohms. Tenth resistor 141 is connected at one end to the third terminal of microcontroller 20 and at another end to node 164. Ninth resistor 140 is connected at one end to a power supply, here provided by power signal 62, and at another end to node 164. The collector of seventh transistor 127 is tied to third coil end 13 and to the collector of eighth transistor 128, which may be, for example, an MMBT4401CT, and which is also driven by third motor control signal 217 through eleventh resistor 142, which may have a value of, for example, 10K Ohms. Eleventh resistor 142 is connected at one end to the third terminal of microcontroller 20 and at another end to the base of transistor 128. The emitter of transistor 127 is connected to a power source, again provided by power signal 62. The emitter of transistor 128 is connected to ground.

Finally, the section of driver circuit 172 responsive to motor control signal 216 (S4), includes a fifth transistor 125, a sixth transistor 126, a sixth resistor 137, a seventh resistor 138, and an eighth resistor 139. Fifth transistor 125, which may be, for example, an MMBT4403CT, is driven by fourth motor control signal 216 through seventh resistor 138, which may have a value of, for example, 4.7K Ohms. Seventh resistor 138 is pulled up to power signal 62 through sixth resistor 137, which may have a value of, for example, 680 Ohms. Seventh resistor 138 is connected at one end to the fourth terminal of microcontroller 20 and at another end to a node 166. Sixth resistor 137 is connected at one end to a power source, here provided by power signal 26, and at another end to node 166. The collector of fifth transistor 125 is tied to fourth coil end 14 and to the collector of sixth transistor 126, which may be, for example, an MMBT4401CT, and which is also driven by fourth motor control signal 216 through eighth resistor 139, which may have a value of, for example, 10K Ohms. Eighth resistor 139 is connected at one end to the fourth terminal of microcontroller 20 and at another end to the base of transistor 126. The emitter of transistor 125 is connected to a power source, again provided by power signal 62. The emitter of transistor 126 is connected to ground.

Motor 10 is hardware controlled by microcontroller 20 to operate according to preprogrammed steps stored in nonvolatile memory. When first motor control signal 219 is a logical one, first transistor 121 is off and second transistor 122 is on, effectively rendering first coil end 11 a logical zero. When first motor control signal 219 is a logical zero, first transistor 121 is on and second transistor 122 is off, effectively rendering first coil end 11 a logical one. If second motor control signal 218 matches first motor control signal 219, then second coil end 12 will logically match first coil end 11, and no current will flow through coil 168 of motor 10. If first coil end 11 is logical one while second coil end 12 is logical zero, then current will flow in one direction through coil 168 of motor 10. If first coil end 11 is logical zero while second coil end 12 is logical one, then current will flow the opposite direction through coil 168 of motor 10. Similarly, third motor control signal 217 and fourth motor control signal 216 are used to manipulate current flow through coil 170 of motor 10 by means of third coil end 13 and fourth coil end 14. The specific logic levels and sequence for a preferred embodiment of the instant invention, as specified by manufacturer of motor 10, are detailed in FIG. 3.

Turning now to FIG. 2, a motor assembly 55, which includes stepper-motor 10 and a plurality of gears (not shown), is mounted on a circuit board 16 upon which is also mounted the remainder of the circuit of FIG. 1, with the majority of the circuit preferably being positioned on a side of circuit board 16 opposite motor assembly 55. Circuit board 16 is preferably colored white or another reflective color in order to reflect light from light emitting diodes 401, 402, 403 away from circuit board 16. Continuing with FIG. 2, motor assembly 55 preferably has an output shaft 17 extending therefrom on which a pointer 15 is mounted near one end. Rotation of output shaft 17 by motor 10 via manipulation of the logic levels on coil ends 11, 12, 13, and 14 causes shaft 17 to assume an angular position. That angular position corresponds to the value of the parameter being measured. A dial face (not shown) is preferably positioned in a plane perpendicular to the axis of shaft 17 between pointer 15 and motor assembly 55 such that rotation of shaft 17 causes pointer 15 to rotate and to sweep across dial face, displaying the value of the measured parameter in a human-readable form.

Figure 3:
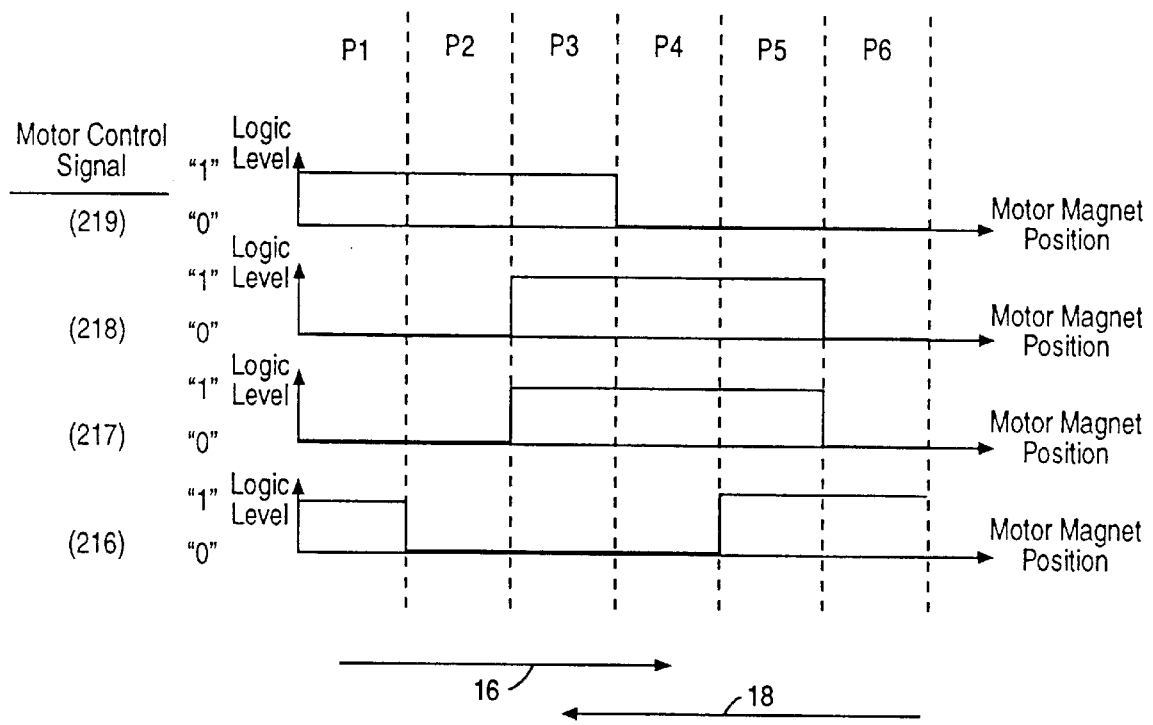
FIG. 3 is a timing diagram showing the manipulation of a stepper-motor for a preferred embodiment of a display apparatus.

Turning now to FIG. 3, a timing diagram illustrating the manipulation of a motor for a preferred embodiment of a display apparatus according to motor manufacturer shows logical "1" and "0" levels for motor control signals 219, 218, 217, 216 at each of six unique motor magnet positions P1, P2, P3, P4, P5, and P6, which wrap around such that P6 is followed by P1. Note that, according to the motor manufacturer, each of unique motor magnet positions P1, P2, P3, P4, P5, and P6 corresponds to 180 different angular positions of motor output shaft 17 due to motor gear ratio of 180:1. Cycling from each position to the next, such as, for example, from P1 to P2 or wrapping around from P6 to P1, causes output shaft 17 to advance one third of an angular degree on a 360 degree circle. Hence, per the motor manufacturer's specification, one complete cycle of P1-P2-P3-P4-P5-P6-back to P1 represents two angular degrees of rotation of output shaft 17, which when multiplied by gear ratio or 180 yields a total of 360 angular degrees of rotation of output shaft 17, or a full circle. Those skilled in the art will recognize that the gear ratio and logic patterns of this preferred embodiment are determined by the internal construction of motor 10 and that a variety of motors could be utilized without departing from the spirit and scope of the instant invention.

Continuing with FIG. 3, it can be seen that position P1 is accomplished by placing logic level "1" on first and fourth motor control signals 219 and 216 and by placing logic level "0" on second and third motor control signals 217 and 218. As indicated by forward direction arrow 16, changing the logic level of fourth motor control signal 216 to a logic "0" will accomplish position P2 and move the motor forward one magnet position, which in a preferred embodiment translates into one-third angular degree of shaft 17 rotation. Continuing, position P3 is attained by changing both second and third motor control signals to logic level "1", which causes shaft 17 to rotate another one-third angular degree in the forward direction. Similarly, another one-third degree of shaft 17 angular rotation is accomplished by dropping first motor control signal 219 to logic level "0" to reach position P4. Position P5 is next achieved by raising fourth motor control signal 216 to logic level "1" and represents another one-third angular degree of rotation of output shaft 17 in the forward direction. Finally, position P6 is accomplished by dropping both second and third motor control signals 218 and 217 to logic level "0". To continue in the forward direction as indicated by forward direction arrow 16, first motor control signal 219 should be raised to logic level "1" as indicated in position P1. In this fashion, motor magnet positions P1, P2, P3, P4, P5, P6 wrap around for continued motion, with one complete six-position wrap P1-P2-P3-P4-P5-P6-P1 representing two full degrees of angular motion, such that 180 total theoretical wraps would be necessary to move output shaft 17 in a full circle.

Continuing with FIG. 3, reverse motion may be effected by shifting positions as indicated by reverse direction arrow 18, from position P6 to P5, P5 to P4, and so on, wrapping from P1 back to P6. Note that in a preferred embodiment motor movement may begin with any one of positions P1, P2, P3, P4, P5, P6 and pass through any quantity of additional positions before stopping within any one of positions P1, P2, P3, P4, P5, P6. Also, the minimum amount of time which the motor must spend in any one position before passing to the next position is determined by the manufacturer's specifications. In a preferred embodiment, the maximum angular rotation frequency for output shaft 17 is two hundred angular degrees per second. Those skilled in the art will recognize that the specific parameters required for moving motor 10 are determined by the manufacturer. The aforementioned information is presented only for clarity in understanding FIGS. 5 through 9 with respect to the instant invention and is not intended to limit the invention to a specific motor configuration.

Figures 4A, 4B:
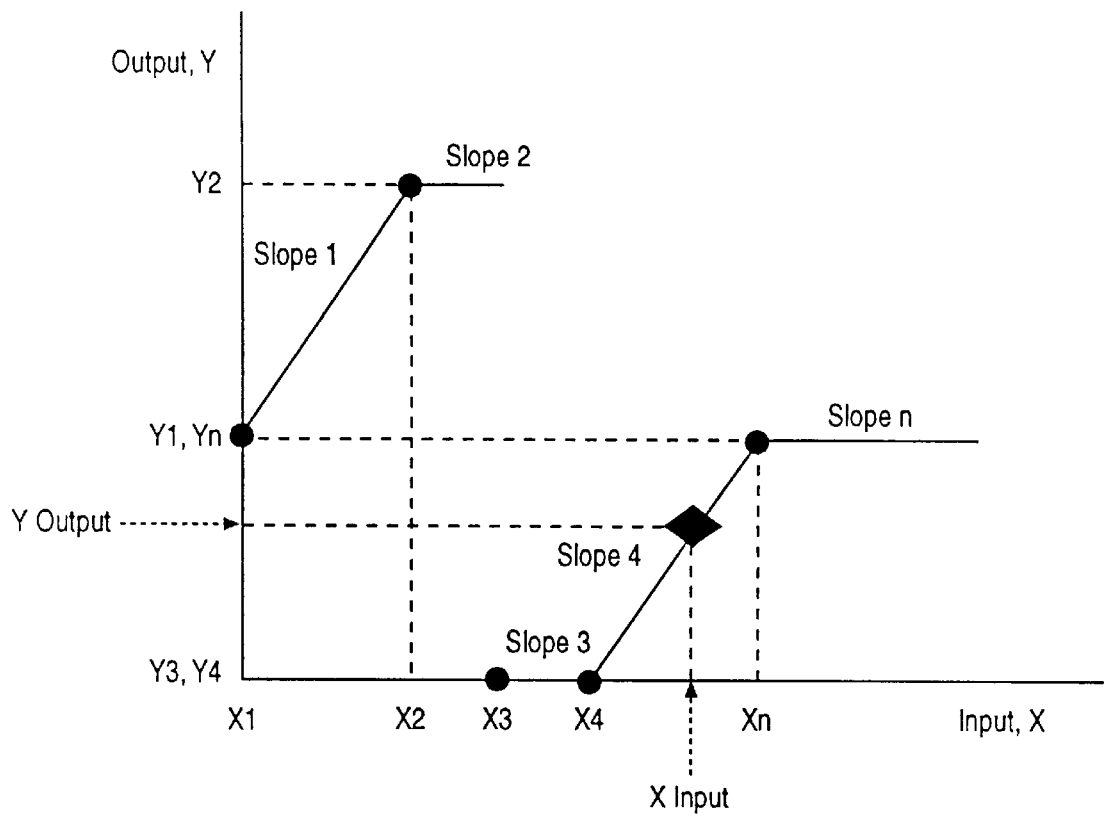
FIG. 4A is a data structure for converting input to output in a display apparatus.
FIG. 4B is a graph of a sample series of points as defined in the data structure of FIG. 4A.

Turning now to FIG. 4A, a data structure for converting input to output in a preferred embodiment of a display apparatus is shown as a table which contains one or more numbered entries. This data structure, or table, may be located in a memory of microcontroller 20, or in an external memory accessible by microcontroller 20. Each numbered entry is a set of X, Y, and slope values which define a specific line. X is in units of receiver input, such as, for example, psi, degrees Fahrenheit, or quarter-RPM. Y is in units of motor output, which in a preferred embodiment is one-third of an angular degree of rotation of output shaft 17. Slope is in units of Y per unit X, such as, for example, one-third angular degrees per psi, or one-third angular degrees per quarter-RPM. Note that in a preferred embodiment, the number of such entries is at least one but could be as many as ten or more.

Turning now to FIG. 4B, a graph of a sample series of points as defined in the data structure of FIG. 4A shows an example of one possible graphic relationship between the five numbered entries 1, 2, 3, 4, & n. An input X value is represented by X input and is shown to be greater than X4 but less than Xn. According to the present invention, the entry having the largest X value less than or equal to the X input value would be chosen. The fourth entry, {X4, Y4, Slope 4} from the table of FIG. 4A would thus be chosen to compute the desired output, which is represented by Y output. Returning to FIG. 4B, the value of Y output may be found by means of simple Algebraic computations as follows:

$$Y_{output}=(Slope\ 4)(X_{input}-X4)+Y4$$

From FIG. 4B, those skilled in the art will recognize that signed input may be accommodated by defining the unsigned equivalent numbers as a table entry. Also, note that the point entries do not need to define a continuous function. While the present invention utilizes the points and slopes method, alternative embodiments could employ standard lookup tables or implement actual linear or nonlinear equations for converting input to output.

Figure 5:
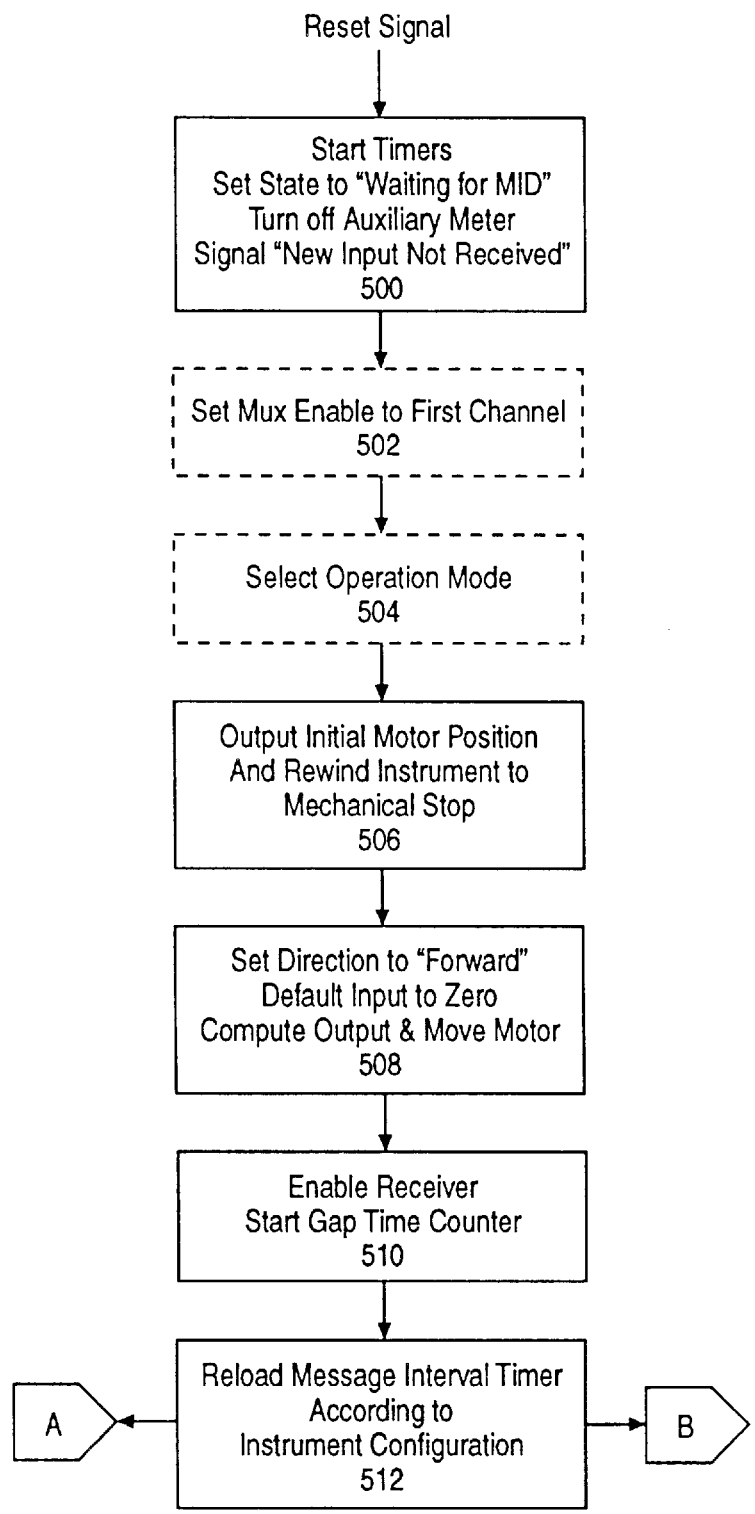
FIG. 5 is a flow chart of the control operations for a display apparatus.

Turning now to FIG. 5, a flow chart of the control operations for a display mechanism begins with the reception of reset signal 21. In general, display mechanism 1 receives a data stream via single wire data bus 64 which it parses and converts into an angular movement of output shaft 17. In a preferred embodiment, this data stream follows a defined protocol, such as the protocol described in the specifications "Serial Data Communications Between Microcomputer Systems In Heavy-Duty Vehicle Applications-SAE J1708" and "Joint SAE/TMC Electronic Data Interchange Between Microcomputer Systems In Heavy-Duty Vehicle Applications-SAE J1587", both of which are recommended practices published by the Society of Automotive Engineers. In general, the data stream includes information packets in the form of a one-byte message identifier (MID) which identifies the sender, a one-byte process identifier (PID) which identifies the intended receiver, one or more bytes of data, and a one-byte checksum which, when added to the other bytes of the packet, equals zero (modulo 256). In a preferred embodiment of the instant invention, these packets are received one byte at time and parsed by microcontroller 20. The parser of microcontroller 20 thus may be in one of several states, depending upon the most recent character received. Also, in a preferred embodiment each packet must be set apart in time from subsequent and prior packets by a minimum amount of time, known as a gap time. Finally, packets with identical PIDs, which are thus intended for the same receiver, are generally sent at some predefined interval known as a message interval (or update interval). The message interval will vary with the parameter being measured. For example, changes in engine speed must be displayed more quickly than changes in fuel level in an engine-driven vehicle. Therefore, packets containing information relating to engine speed may have a message interval of 0.1 seconds, while packets containing information relating to fuel level may have a message interval of 1.0 seconds. Those skilled in the art will recognize that the specific protocol implemented by the instant invention could be varied without departing from the spirit and scope thereof.

With these principles in mind, FIG. 5 may now be analyzed in detail. In step 500, reset signal 21 causes microcontroller 20 to start system timers, default the status of the parsing receiver to the "waiting for MID" state, turn off auxiliary meter signal 215, and default conversion status to reflect that new input has not yet been received. Next an optional step 502 denoted by dashed lines may take place, wherein the state of a multiplexer enable is flipped to select between single wire data bus 64 and a second single wire data bus (not shown). This is not necessary to the spirit and scope of the present invention and is included only to show how the present invention may be utilized to implement a synchronizing function, such as is required by, for example, a tachometer synchronizer, by adding to the hardware a second single wire data bus and a multiplexer to select between the single wire data bus 64 and the second single wire data bus. The second single wire data bus carries a second data input signal having a second parameter value. When implementing a synchronizing function, the angular position of output shaft 17 corresponds to a difference between the first parameter value and the second parameter value rather than the first parameter value alone.

Continuing with FIG. 5, in step 504, optional selection of operating mode is completed, which is discussed in FIG. 1 with reference to configuration indicators 26, 27, 28, 29, 211. As noted, this step is optional and would be neither necessary nor desirable if microcontroller 20 of display mechanism 1 is programmed on the manufacturing line.

Continuing with FIG. 5, in step 506, an initial motor position is selected by placing an initial pattern of logical ones and zeros on motor control signals 219, 218, 217, and 216, as discussed in FIG. 3. To synchronize the actual mechanical position of stepper-motor 10 with the electronic position of motor 10 maintained by microcontroller 20, motor 10 is repeatedly sequenced through its motor positions P6, P5, P4, P3, P2, P1 until it has cycled an equivalent of its theoretical maximum sweep in angular degrees. Note that motor 10 is sequenced in the direction of arrow 18 in FIG. 3. In a preferred embodiment, the assembly of motor 10, output shaft 17, and pointer 15 has a mechanical stop such that the maximum sweep of the assembly is limited to, for example, 315 angular degrees. Hence, performance of step 506 guarantees that output shaft 17 will be positioned so that pointer 15 will be in a known location with respect to dial graphics (not shown).

Continuing with FIG. 5, in step 508, a stored direction indicator is initialized to the forward direction and initial input is initialized to zero. An output which corresponds to this input is computed and the motor moved to this output position as is later discussed with reference to FIGS. 6 and 8. Continuing with FIG. 5, in step 510, a serial receiver within microcontroller 20 is started, and a timer which measures the amount of time between received characters, known as the gap time, is started. This completes system initialization, and operation continues in a loop which begins in step 512 by reloading a message interval timer with a message interval timer value. The message interval timer value is based upon the time between similar messages as defined in the protocol and is used to track whether display apparatus 1 is still receiving information. Operation then continues with FIG. 6, as denoted by off page connector B.

Figure 6:
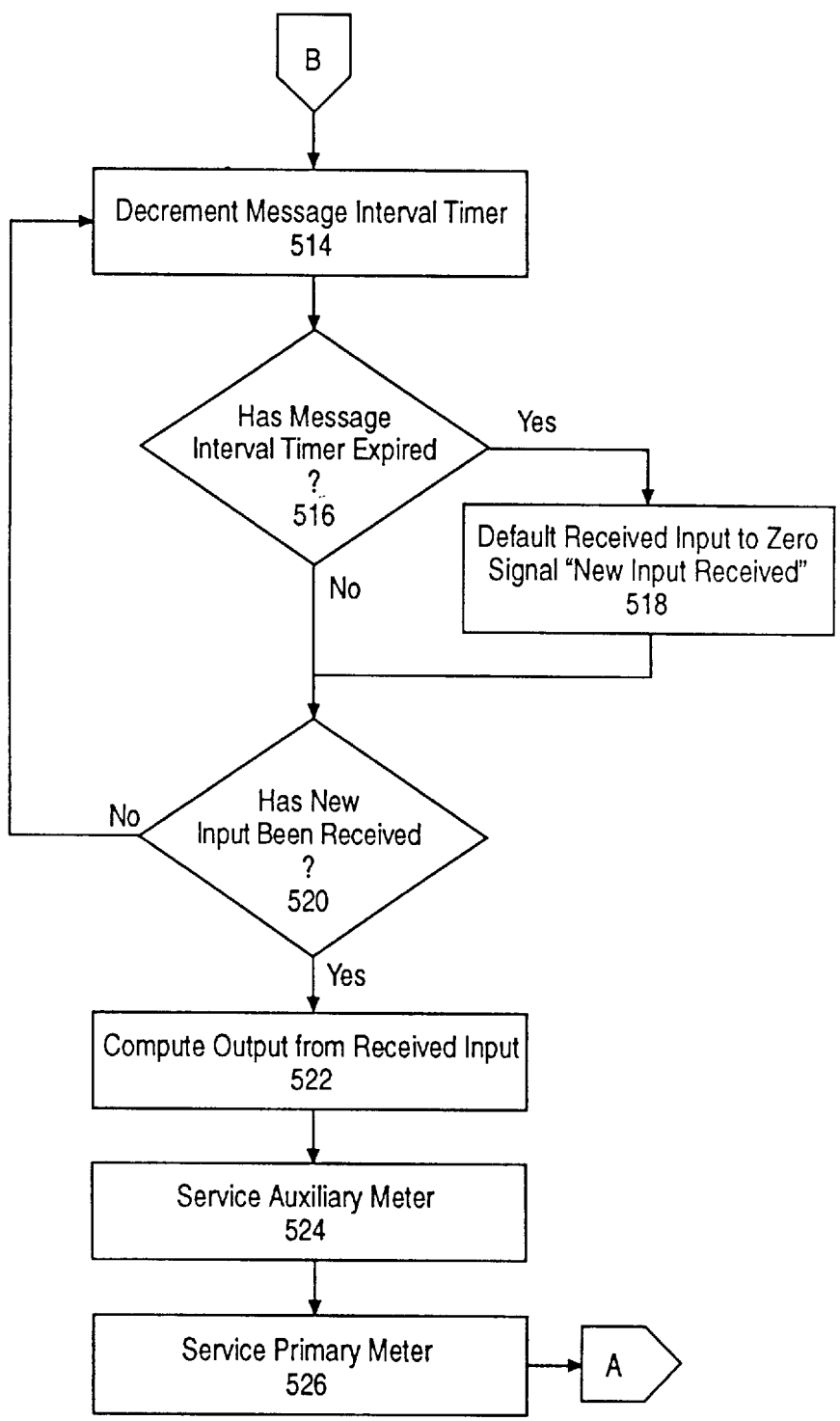
FIG. 6 is a first continuation of the flow chart of the control operations for a display apparatus.

Turning now to FIG. 6, a first continuation of the flow chart of the control operation for display apparatus 1 begins in step 514 by decrementing the message interval timer value in the message interval timer. In step 516, the message interval timer value is evaluated to determine whether the message interval timer has expired. If the message interval timer has expired, indicating that anticipated messages have not been received for some predefined time period, such as, for example, thirty seconds, then step 518 occurs in which the received input, or parameter value, is defaulted to zero and an input received signal is set to indicate that new input has been received and must be processed. Once timer expiration has been checked and handled, operation continues in step 520 by checking to see whether new input has been received. If new input has not been received then operation returns to decrementing the message interval timer value in step 514. If a new message has been received, whether by default as in step 518 or by the parsing mechanism discussed in FIG. 10, then step 522 occurs in which the corresponding output value is computed from the input. Next, in step 524, an optional auxiliary meter is serviced if present. In step 526, the primary meter is serviced, which generally results in movement of output shaft 17. Operation then resumes with step 512 of FIG. 5 as denoted by off page connector A.

Figure 7:
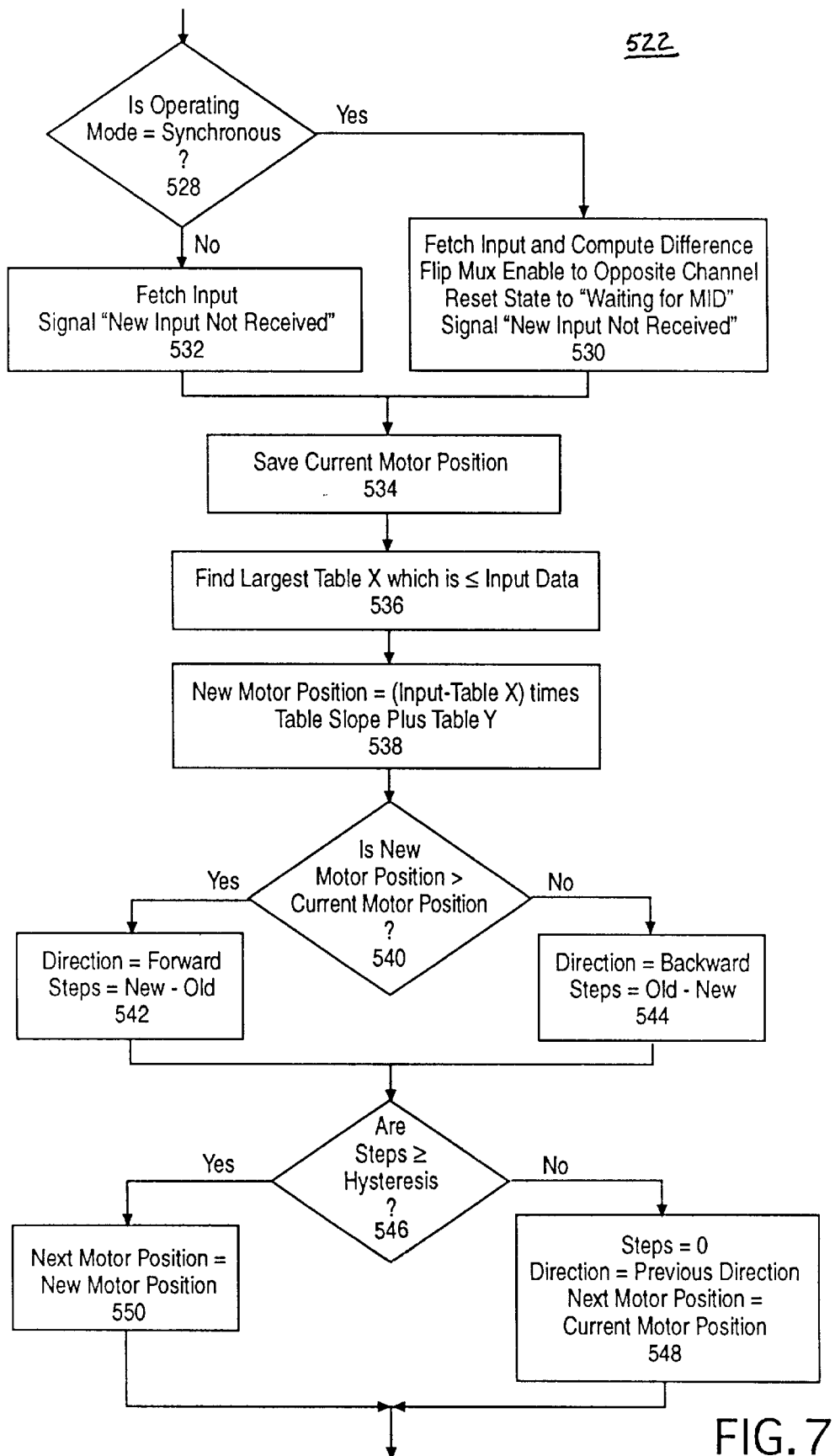
FIG. 7 is a flow chart showing the computation of output from received input.

Turning now to FIG. 7, a flow chart shows the details of computing of output from received input as presented in FIG. 6 at step 522. The computation begins in step 528 of FIG. 7 by checking to see whether an operating mode indicator of display apparatus 1 is set to be synchronous. As discussed with FIG. 5, synchronous operation requires displaying the difference between two parameter values, such as, for example, the difference between RPM values of twin engines in a large yacht. Continuing with FIG. 7, step 530 occurs if synchronous operation is requested. In step 530, the parameter value of the data input signal carried by single wire data bus 64 is saved. The enable of the optional multiplexer is switched to point to the another single wire data bus. A saved copy of the most recent parameter value from the second single wire data bus is brought forth, and a difference between the parameter value from single wire data bus 64 and the parameter value of the second single wire data bus is computed. The status of the parser is defaulted to waiting for a MID and a signal is cleared to indicate that no new input has been received.

If the operating mode indicator does not indicate that synchronization is desired in step 528, then step 532 occurs. In step 532, only a single parameter value is fetched from single wire data bus 64 and a signal is cleared to indicate that the new input has been accepted. This permits the receiving parser to accept or "buffer" additional data while the motor is being moved. For all operating modes, the next step, step 534, is to save the current motor position as a current motor position value. Then a new motor position value is computed by using a table of one or more defined points and slopes as described in FIGS. 4A and 4B. Continuing with FIG. 7, in step 536, the largest table X value which is less than or equal to the input X value is located. In step 538, the new motor position value is computed as the sum of a table Y value corresponding to the table X value, plus the product of a table slope value corresponding to the table X value times the difference between the input X value and the table X value. In step 540, the new motor position value is compared to the current motor position value. When the new motor position value is greater in third-degrees than the old, or current, motor position value, then step 542 occurs in which the motor direction is deemed to be forward, and the number of motor steps, or positions, to be taken is the new position value minus the old position value. When the new motor position value is less than or equal to the old motor position value 540, then step 544 occurs in which the direction is deemed to be backwards, or reverse, and the number of motor positions, or steps, to be taken is the old motor position value minus the new motor position value. Finally, in step 546, a check is made to see whether the number of steps to be taken is greater than or equal to some predefined hysteresis value. If the number of steps is smaller, then step 548 occurs in which a next motor position value is deemed to be the present motor position and the direction remains the same as previous. The number of steps is reduced to zero, which will mean that the motor does not move. However, if the number of steps exceeds or equals the hysteresis, then step 550 occurs in which the next motor position value is deemed to be the new motor position value 550. This concludes the conversion process of step 522 in FIG. 5.

Figure 8:
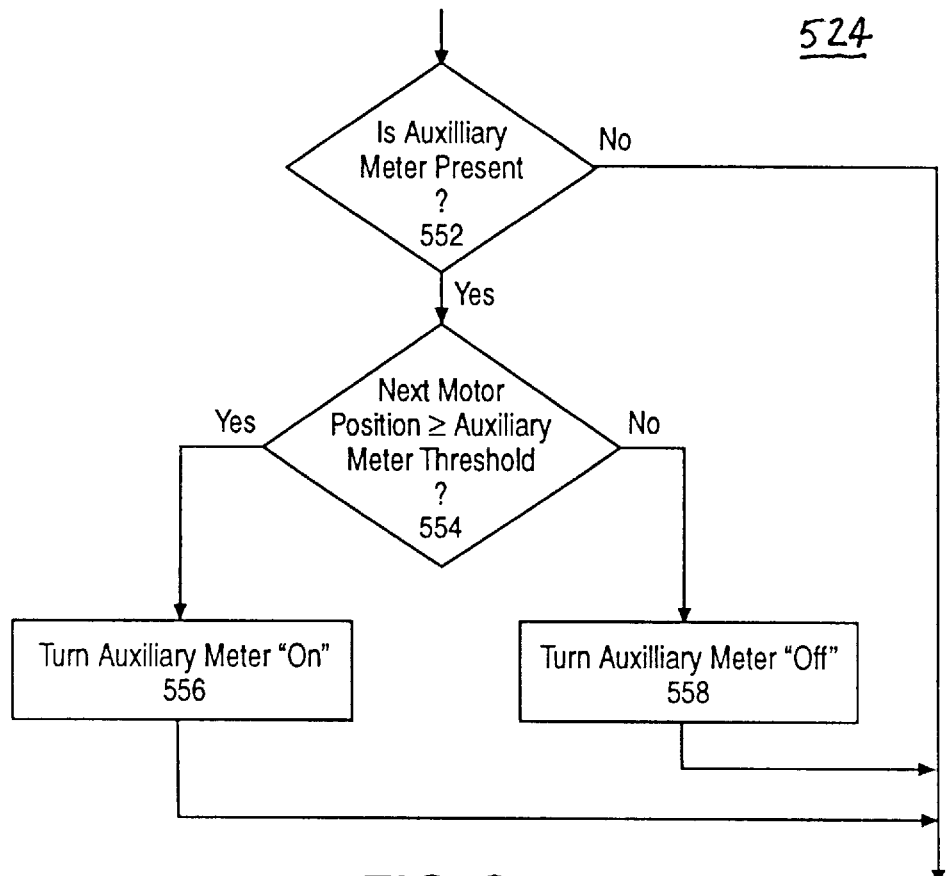
FIG. 8 is a flow chart showing the servicing of an optional auxiliary meter.

Turning now to FIG. 8, the servicing of an optional auxiliary meter as defined by step 524 in FIG. 5 begins with step 552 by checking a predefined configuration stored within microcontroller 20 to determine whether an auxiliary meter is present. If not, then auxiliary meter service is deemed complete. If an auxiliary meter is present, then step 554 occurs in which a test is made to determine whether a predefined auxiliary meter threshold stored within microcontroller 20 has been met by the computed next motor position value. If the threshold has been met, then the auxiliary meter is turned on in step 556. If the threshold has not been met, then the auxiliary meter is turned off in step 558. Note that the threshold test could be reversed such that the auxiliary meter is turned "on" when under threshold and turned "off" when over threshold, without departing from the spirit and scope of the present invention. Also, note that the ability to drive an auxiliary meter, such as, for example, an hourmeter, is not critical to the spirit and scope of the instant invention.

Figure 9:
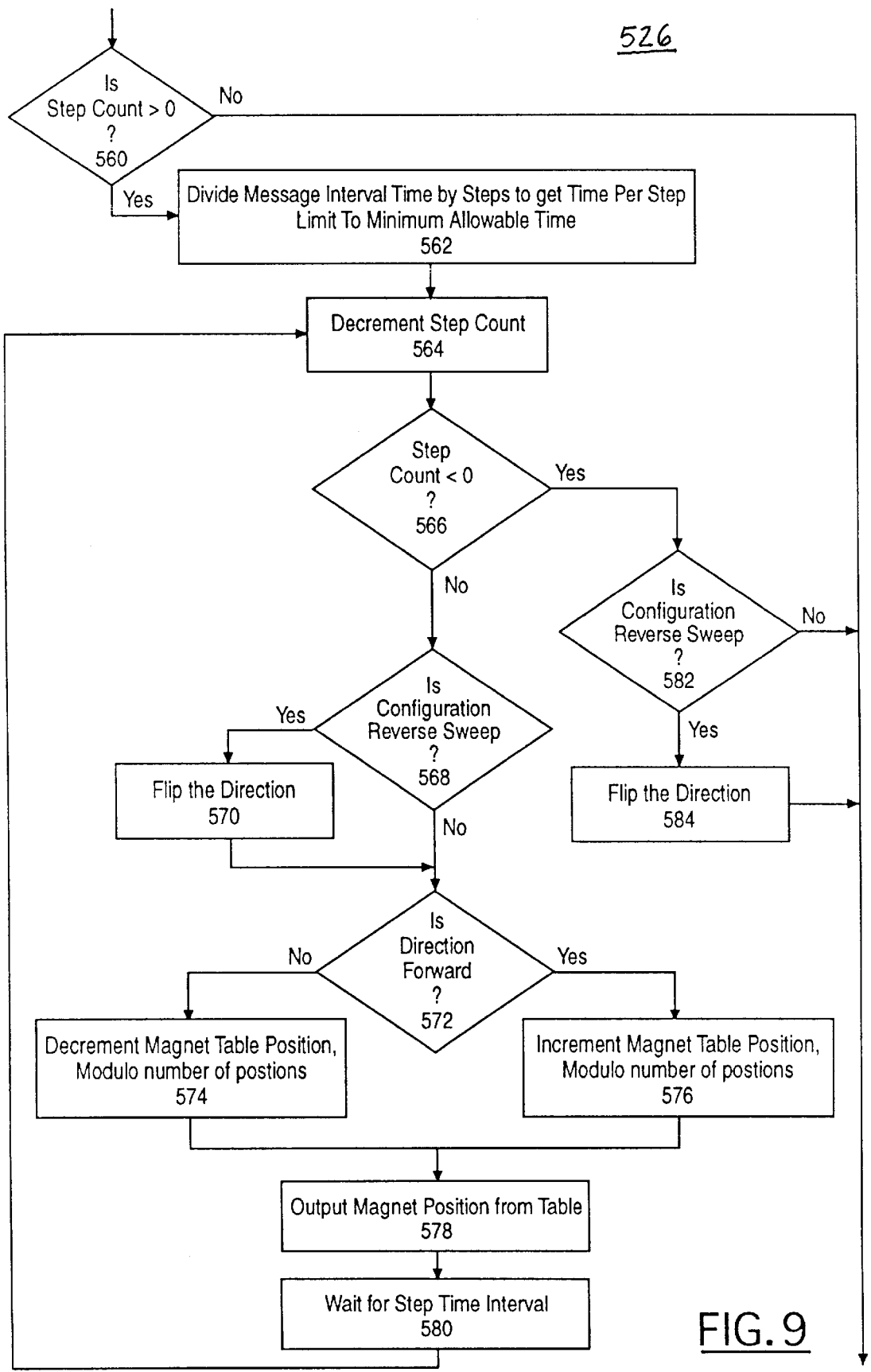
FIG. 9 is a flow chart showing the servicing of a primary meter.

Turning now to FIG. 9, a flow chart showing the servicing of a primary meter as defined at step 526 in FIG. 5 begins in step 560 by checking for a step count of more than zero. If the step count is zero, then servicing of the primary meter is complete. Otherwise, step 562 occurs in which the interval time between messages is divided by the number of steps to generate the amount of time per step, which is limited to a minimum frequency which is defined by the manufacturer's specifications for stepper-motor 10. Step count is then decremented by one in step 564 and is evaluated to see whether it has gone negative in step 566. If it has not, then steps remain to be taken. The configuration is checked in step 568 to see whether a reverse sweep is selected, with reverse sweep defined as a system where increasing output values cause the pointer to move counter-clockwise. If this is the case, then the direction signal is flipped in step 570 to the opposite state in order to traverse the positions in the correct order, as described in FIG. 3. Continuing with FIG. 9, the direction is then evaluated in step 572 to determine which way the unique magnet positions should be traversed. If the direction is forward, then step 574 occurs in which the positions increase from P1 to P2, P2 to P3, and so forth, modulo six such that P6 wraps to P1. If the direction is not forward, then step 576 occurs in which the positions decrease from P6 to P5, P5 to P4, and so forth, modulo six such that P1 wraps to P6. Next, in step 578, the desired position is provided to motor control signals 219, 218, 217, 216, which causes motor 10 to rotate output shaft 17. As shown in step 580, the system maintains this position on motor control signals 219, 218, 217, 216 for at least the step time interval which was computed earlier in step 562. The primary meter then continues to be serviced beginning again with step 564.

Continuing with FIG. 9, if the step count in step 566 indicates that steps do not remain to be taken, step 582 occurs in which a check is made to see whether the configuration is reverse sweep. If it was not, then servicing of the primary meter is complete. If it was then the direction bit is flipped back to its original value in step 584, after which servicing of the primary meter is complete.

Figure 10:
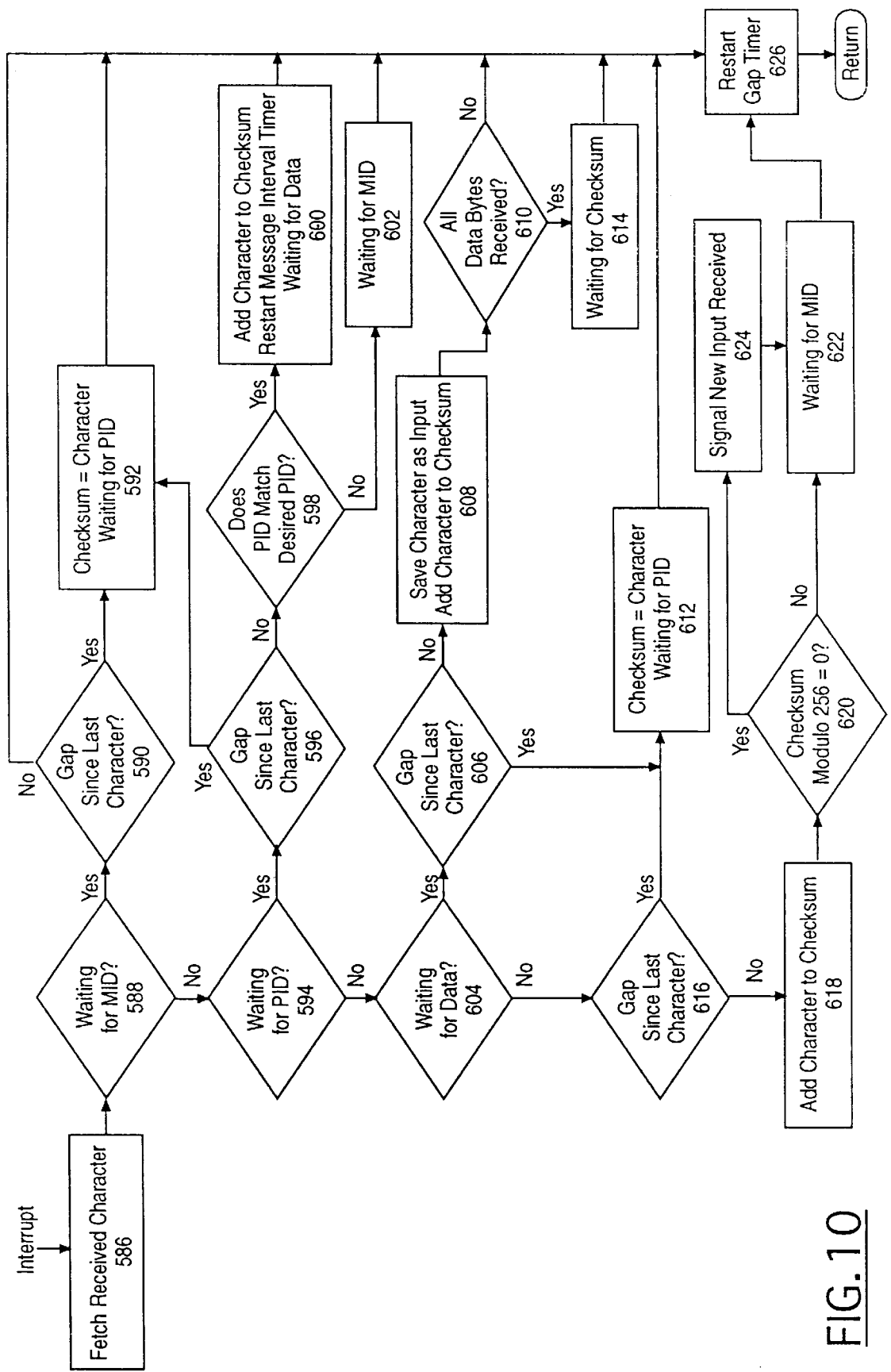
FIG. 10 is a flow chart of a parsing receiver operation for a display apparatus.

Turning at last to FIG. 10, a flow chart of a parsing receiver operation for a preferred embodiment of display mechanism 1 begins when a character received from single wire data bus 64 causes an interrupt to microcontroller 20, suspending microcontroller 20 operation. First, in step 586, the received character is fetched. Next, in step 588, the status of the parser is checked to see whether the system is waiting for a message identifier (MID). If a MID is expected, then a check is made in step 590 to determine whether a time gap has taken place since the reception of the last character. If a gap has not been received, then according to the protocol, the incoming character cannot be an MID. The final step of the parsing receiver, step 626, which is executed for all paths, is next taken, in which the gap timer is restarted. If the determination in step 590 indicates there was a gap since the last character was received, then step 592 occurs in which the incoming character is saved as the accumulated checksum and the parser status is changed to Waiting for PID. The system then proceeds to step 626 as described earlier.

Continuing with FIG. 10, if step 588 indicates that the status is not writing for an MID, step 594 occurs in which a check is made to determine whether the status is waiting for a PID. If the system is waiting for a PID then a check is made in step 596 to determine whether there has been a gap since the last character. If a gap has been seen, then the incoming character is deemed to be another MID, such as might occur if part of a message was lost and two MIDs in a row were sent. Processing continues with step 592 and the system remains in the Waiting for PID state. If a gap was not seen then the incoming character is examined in step 598 to determine whether it matches the PID in the configuration of display apparatus 1 as stored in microcontroller 20. If the PID does not match, then the incoming packet is of no interest to the display apparatus 1. The status of the system returns to waiting for MID in step 602 and processing continues with step 626. If the PIDs match then step 600 occurs in which the incoming character is added to the accumulated checksum and the message interval timer is restarted because the system has received a message meant for it. The status of the system is also changed to waiting for data, and processing continues with step 626.

Continuing with FIG. 10, if step 594 indicates that the status of the system was not Waiting for PID 594 then the system checks to see whether the status is Waiting for Data in step 604. If the system is waiting for data, then a check is made in step 606 to verify that no gap has occurred since the last character was received. If a gap occurred, step 612 occurs in which the incoming character is treated like a MID such that the character is saved as the checksum and the status is changed to waiting for PID. Processing then continues with step 626. If a gap did not occur between incoming characters, then step 608 occurs in which the character is saved as input data and a copy is added to the accumulated checksum. Next a check is made in step 610 to determine whether this is the last data byte to be received. If more data bytes are expected, then the state is not changed and processing continues with step 626. If this in indeed the last data character to be received for this message packet, then the state is changed in step 614 to waiting for checksum and processing continues with step 626. Note that in a preferred embodiment, the protocol dictates that message packets may contain multiple data bytes, so the quantity of data bytes expected could be predefined in microcontroller 20 or even derived from the PID value if the protocol so permits.

Continuing with FIG. 10, if step 604 indicates that the system status is not waiting for data, then the status defaults to the remaining possible state, which is waiting for the message checksum. A check is made in step 616 to determine whether a gap has taken place since the last character was received. If a gap has occurred, then the previous message is deemed incomplete. The incoming character is treated as a MID and processing continues with step 612 as detailed earlier. If a gap has not occurred, then the incoming character is added to the accumulated checksum in step 618. Under the protocol of the preferred embodiment, this should cause the accumulated checksum modulo 256 to equal zero. The checksum is evaluated in step 620 to determine if the checksum modulo 256 does indeed equal zero. If it does not, then the state is changed to waiting for MID in step 622 and processing continues with step 626. If the accumulated checksum modulo 256 does equal zero, then a signal is raised in step 624 to indicate that new input has been received and processing continues with step 622 as previously detailed. This signal will be recognized in step 520 of FIG. 6 and the input will be processed as detailed therein. Finally, While FIG. 10 describes a specific protocol of a preferred embodiment of a display apparatus 1, alternate protocols could be implemented without departing from the spirit and scope thereof.

From the foregoing description, one of ordinary skill in the art can easily ascertain the essential characteristics of this invention and, without departing from the spirit and scope of the claims, can make various changes and modifications to the invention to adapt it to various usages and conditions.

We claim:

1. A display apparatus, comprising:
   means, responsive to a first parameter value, for generating a motor control signal, said generating means comprising control means having memory means associated therewith for storing a plurality of data entries wherein each entry includes a respective X value, Y value and slope value, said control means further comprising means for selecting one of said data entries in accordance with said first parameter value, said motor control signal being generated in accordance with said selected one of said data entries; and a motor assembly having a stepper-motor portion, said stepper motor portion responsive to said motor control signal, for rotating an output shaft extending from said motor assembly;

wherein an angular position of said output shaft corresponds to said first parameter value.

2. The display apparatus of claim 1 further comprising a pointer mounted near one end of said shaft for rotation therewith.

3. The display apparatus of claim 2 wherein said control means includes a receiver configured to receive a serial data signal comprising said first parameter value wherein a time interval between said first parameter value and an updated first parameter value defines an update interval, and wherein said control signals collectively define a plurality of motor magnet positions corresponding to angular steps of said output shaft;

said control means further including means for generating said control signals such that said motor magnet positions are traversed substantially uniformly over said update interval.

4. The display apparatus of claim 1, wherein said generating means is responsive to said first parameter value and a second parameter value and said angular position of said output shaft corresponds to a difference between said first parameter value and said second parameter value.

5. The display apparatus of claim 1, wherein said control means comprises a microcontroller programmed with a first set of program steps.

6. The display apparatus of claim 1, said stepper-motor portion having a coil, further comprising a driver circuit, responsive to said motor control signal, which generates a current in said coil.

7. A display apparatus for an engine-driven vehicle comprising:

a microcontroller, responsive to a first parameter value, for generating a first control signal, a second control signal, a third control signal, and a fourth control signal, said microcontroller having a memory associated therewith for storing a plurality of data entries wherein each entry includes a respective X value, Y value and slope value, said microcontroller further comprising means for selecting one of said data entries in accordance with said first parameter value, said motor control signal being generated in accordance with said selected one of said data entries;

a motor assembly having a stepper-motor portion, said stepper-motor portion responsive to said first, second, third and fourth control signals, for rotating an output shaft extending from said motor assembly wherein an angular position of said output shaft corresponds to said first parameter value;

a pointer mounted near one end of said output shaft;

said microcontroller including a receiver configured to receive a serial data signal comprising said first parameter value wherein a time interval between said first parameter value and an updated first parameter value defines an update interval, and wherein said control signals collectively define a plurality of motor magnet positions corresponding to angular steps of said output shaft;

said microcontroller further including means for generating said control signals such that said motor magnet positions are traversed substantially uniformly over said update interval.

8. The display apparatus of claim 6, wherein said microcontroller is responsive to said first parameter value and a second parameter value and said angular position of said output shaft corresponds to a difference between said first parameter value and said second parameter value.

9. The display apparatus of claim 6 wherein said microcontroller is programmed with a first set of program steps.

10. The display apparatus of claim 7, said stepper-motor portion having a first coil and a second coil, further comprising a driver circuit for generating a current in said first and second coils.

11. The display apparatus of claim 10, wherein each end of said first and second coils is connected to a section of said driver circuit, said section comprising:

a first resistor connected at one end to a power source and at another end to a common node;

a second resistor connected at one end to a terminal of said microcontroller and at another end to said common node, said terminal outputting one of said first motor control signal, said second motor control signal, said third motor control signal and said fourth motor control signal;

a first transistor having a first collector connected to said coil end, having a first base connected to said common node, and having a first emitter connected to said power source;

a second transistor having a second collector connected to said coil end, having a second base, and having a second emitter connected to ground; and a third resistor connected at one end to said terminal at another end to said second base.

12. The display apparatus of claim 11, said section including a diode disposed between said power source and said coil end.

13. The display apparatus of claim 7, further comprising a circuit board having a reflective surface, said motor assembly mounted on one side of said circuit board.

14. A method for displaying data comprising the steps of:

(A) storing a plurality of data entries in a memory wherein each entry includes a respective X value, Y value and slope value;

(B) generating, in response to a first parameter value, a motor control signal wherein said generating step includes the substeps of:

selecting one of said data entries in accordance with said first parameter value;

determining a desired angular position in accordance with said selected one of said data entries; and (C) driving, in response to said motor control signal, a stepper-motor portion of a motor assembly that rotates an output shaft of said assembly having a pointer affixed thereto near an end thereof such that said pointer assumes said desired angular position.

15. The method of claim 14, wherein said motor control signal is generated in response to said first parameter value and a second parameter value and said angular position corresponds to a difference between said first parameter value and said second parameter value.

16. The method of claim 14, wherein said motor control signal is generated in a first sequence when a stored direction indicator indicates a forward direction, and wherein said motor control signal is generated in a second sequence, opposite said first sequence, when said stored direction indicator indicates a reverse direction.

17. The method of claim 14, wherein said motor control signal is generated in a first sequence when a configuration indicator does not indicate a reverse sweep, and wherein said motor control signal is generated in a second sequence, opposite said first sequence, when said configuration indicator indicates a reverse sweep.

18. The method of claim 14, wherein said determining step includes the substep of multiplying said slope value of said selected data entry by a result obtained by subtracting said X value of said selected data entry from said first parameter value, and then adding said Y value of said selected data entry after said multiplication.

19. The method of claim 18, wherein said X value, said Y value and said slope value are stored in a data structure in said memory.

20. The method of claim 18, wherein said first parameter value is used to index said data structure.

21. The method of claim 14, further comprising the step of activating an auxiliary meter, responsive to an auxiliary meter signal, said auxiliary meter signal generated responsive to said first parameter value when an auxiliary meter threshold is reached.

22. The method of claim 14 wherein said first parameter value is included in a message received by the display apparatus, said method further including the steps of:

measuring a time interval from when the message is received by the display apparatus;

determining when the time interval exceeds a predefined time period, and setting said first parameter value to zero in response thereto.

* * * * *